United States Patent [19]

Fairweather

[11] Patent Number: 5,172,333
[45] Date of Patent: Dec. 15, 1992

[54] INTERFACING HAND-HELD REMOTE CONTROLLERS FOR COMPUTER CONTROLLED OPERATION

[75] Inventor: John R. C. Fairweather, Los Angeles, Calif.

[73] Assignee: Third Point Systems, Inc., Pacific Palisades, Calif.

[21] Appl. No.: 662,249

[22] Filed: Feb. 27, 1991

[51] Int. Cl.[5] .................................................. G06F 1/00
[52] U.S. Cl. ...................................................... 364/708
[58] Field of Search .................... 364/708, 707, 709.12; 340/825.25

[56] References Cited

U.S. PATENT DOCUMENTS 4,964,073  10/1990  Watanabe ............................. 364/707
5,077,552  12/1991  Abbate ............................ 340/825.25

Primary Examiner—Long T. Nguyen
Attorney, Agent, or Firm—Beehler & Pavitt

[57] ABSTRACT

An interface for operating a commercially available hand-held infra-red remote or the like through a serial communications port of a host computer has normally open semiconductor analog switches, a ribbon cable connector mateable to the existing connector of the remote's keypad for connecting the switches to the keypad scanning circuit of the remote in parallel with the keypad matrix conductors, and a microcontroller for converting command selecting serial output from the host machine for controlling the analog switches to simulate manual actuation of the keypad and thereby cause the remote to transmit a desired command. The interface package may be installed in the original housing of the remote and concurrent manual and computer operation of the remote remains possible.

12 Claims, 1 Drawing Sheet

INTERFACING HAND-HELD REMOTE CONTROLLERS FOR COMPUTER CONTROLLED OPERATION

BACKGROUND OF THE INVENTION

1. Field of the Invention

The present invention pertains generally to the field of electronic digital computers and more particularly relates to a generic method for providing computer access to, and control over, infra-red or other transmission media, via a suitably modified but otherwise standard hand held remote control unit. In the interest of brevity, the following description description refers to such a remote control unit as a "remote". According to this invention, an electronic interface simulates manual switch closures which are 'seen' by the processor resident in the remote control so that it will transmit the control sequence corresponding to the selected switch over the transmission medium. When used in conjunction with a 'learning' infra-red remote, this gives any standard microcomputer the ability to control a large number of devices which commonly respond to one or more unique infra-red control signals. Common examples of such devices are T.V.'s, V.C.R.'s, and stereo system components, although there are many other application areas in both the home and commercial/industrial environments.

2. State of the Prior Art

Microcomputer installations are now widespread in homes, offices and industry and increasingly are employed for controlling other devices in an intelligent, flexible manner under control of an applications program. One of the major problems encountered in designing and implementing such a microcomputer based control system, is the difficulty of interfacing the computer to the various devices to be controlled. Typically, dedicated wiring between the computer and its sensors and control outputs is required. This wiring is often hard to install, expensive and invariably results in unsightly cables and connectors cluttering up the environment to be controlled. On partial solution to this problem is to use the electrical power wiring of the building to transmit the required control signals, and a number of commercial products are available which utilize this approach. In particular the popular X-10 (Registered Trademark) control system is widely available and provides control over a large number of devices. The drawback with this and other similar systems is that it provides only gross control over devices, since it basically only switches the power supply to the device. Thus, these systems are generally limited to ON/OFF control of A/C powered devices, and in the case of incandescent lights, control over the brightness. With the recent definition of the CEBUS standard, devices may emerge which can respond to more complex commands sent over building wiring; however these devices are still a number of years off, and moreover this does not address the problem of controlling the current generation of devices which do not incorporate a CEBUS interface.

In many existing devices this extended control problem has been addressed by providing an infra-red remote interface giving access to the full range of device functions without requiring the operator to physically move to the device in question. Products are commercially available which provide infra-red send/receive capabilities to a microcomputer. These, however, are dedicated devices which must be connected to the computer in order to operate. There is currently no system which takes the approach of modifying an existing remote control unit in such a manner as to provide computer control while also allowing the remote to be used manually as originally intended by its manufacturer. The purpose of this invention is to provide a generic connection mechanism or interface between device remote control units and a microcomputer, in order to permit manual and computerized remote control while allowing the flexibility of choosing among the wide range of commercially available "learning remotes".

SUMMARY OF THE INVENTION

This invention provides a means whereby any microcomputer having a serial interface can control devices via a modified but commercially available remote control. The interface of this invention is characterized by the fact that a pre-existing hand-held remote control intended for manual operation is modified such that an additional package of electronics is included which interfaces to the keypad matrix circuitry of the remote. This interfacing is accomplished in such a way that the additional electronics enables manual switch actions to be detected and acted upon by the normal, existing electronic circuits of the remote. This approach can be applied not only to control over infra-red remotes, but to any transmission technology which incorporates a control device using a set of keys whose closure is detected by monitoring connectivity along the sides of a two dimensional keypad matrix. Other examples of such matrices may be found in the keyboards of microcomputers, radio transmitters, front panels of complex instruments, telephone systems and many other areas. Due to the large number of devices available on the market today which have infra-red remotes, but no means of computerized control, the principal application area envisaged is with infra-red remote controls.

Keypad matrix arrangement and scanning methods are generally standard throughout the industry and consist of a two dimensional matrix of conductors, arranged in rows and columns, in which any row may be connected to any column by pressing a corresponding switch. This action causes electrical contact to be established at one row-column address within the matrix. In order to determine exactly which key has been depressed, a scanning circuit sends regular pulses along each wire of one axis (e.g. the rows) in sequence, while monitoring for the presence of pulses on the other axis (the columns). This procedure allows both the row and the column associated with the depressed switch to be determined.

The modifying electronics package typically but not necessarily includes a simple microcontroller, since this allows communication between the package and the controlling microcomputer to be conducted in ASCII over a standard RS-232 serial connection. Power to the electronics package may be derived either from the remote's battery or from the microcomputer's serial interface.

Upon receipt from the computer serial port of a data sequence containing a switch closure command including the row and column address of the switch being addressed, and optionally the duration for which it is to be depressed, the resident microcontroller software causes semiconductor switches contained in the electronics package to be closed such that the effect on the row-column connectivity of the keypad matrix is identical to that which would have been caused by physically pressing the addressed switch.

The modifying electronics package fits inside the case of the remote control in question and is connected to the controlling microcomputer via an easily attached/detached connector, such as a telephone modular plug or a small phone jack. In this manner it becomes possible for the user to detach the remote from the computer and use it manually, as desired. Manual operation of the remote while still interfaced to the computer is also possible.

Connection between the electronics package and the keypad matrix is typically accomplished via a multiconductor ribbon cable which connects to the point within the remote where the keypad circuit board is connected to the rest of the remote unit's existing electronics. Normally, since a solid base is required against which to press the keypad keys, the remote will have a dedicated circuit board which serves this purpose and also has the conductor traces and contacts which constitute the matrix itself. This keypad board is generally connected to a main circuit board in the remote by a ribbon cable containing the parallel wires connecting to the end points of the conductors of the keypad board which constitute the rows and columns of the matrix. Hence, for an 8-by-8 keypad matrix which yields a possible 64 keys on the front panel of the remote, there will be a minimum of eight conductors associated with the row addresses and eight conductors associated with the column addresses. The ribbon cable connects the modifying electronics package to these sixteen conductors, as brought out on the keypad board connector. If power to the package is to be derive form the remote itself, an additional two wires are required which connect either directly to the battery terminals or to a convenient available battery derived voltage supply point in the remote.

Finally, a number of commercially available remote control units include a latching mode switch which allows the functions of some or all of the front panel switches associated with the keypad matrix to be redefined for other purposes. This device is used to avoid the need to physically install more switches on the front panel of the remote, while still allowing an increased number of command sequences or functions to be learned by the remote and transmitted. In order to allow computer control over all possible functions of the remote, it is necessary for the modifying electronics package to be able to control this mode switch as well. This is accomplished by providing additional semiconductor switches across, i.e. in parallel with, such mode switches, which can be controlled by the modifying electronics package, provided that the existing mode switch is not mechanically latched in the 'closed' position.

DETAILED DESCRIPTION OF THE PREFERRED EMBODIMENT

Figure 1:
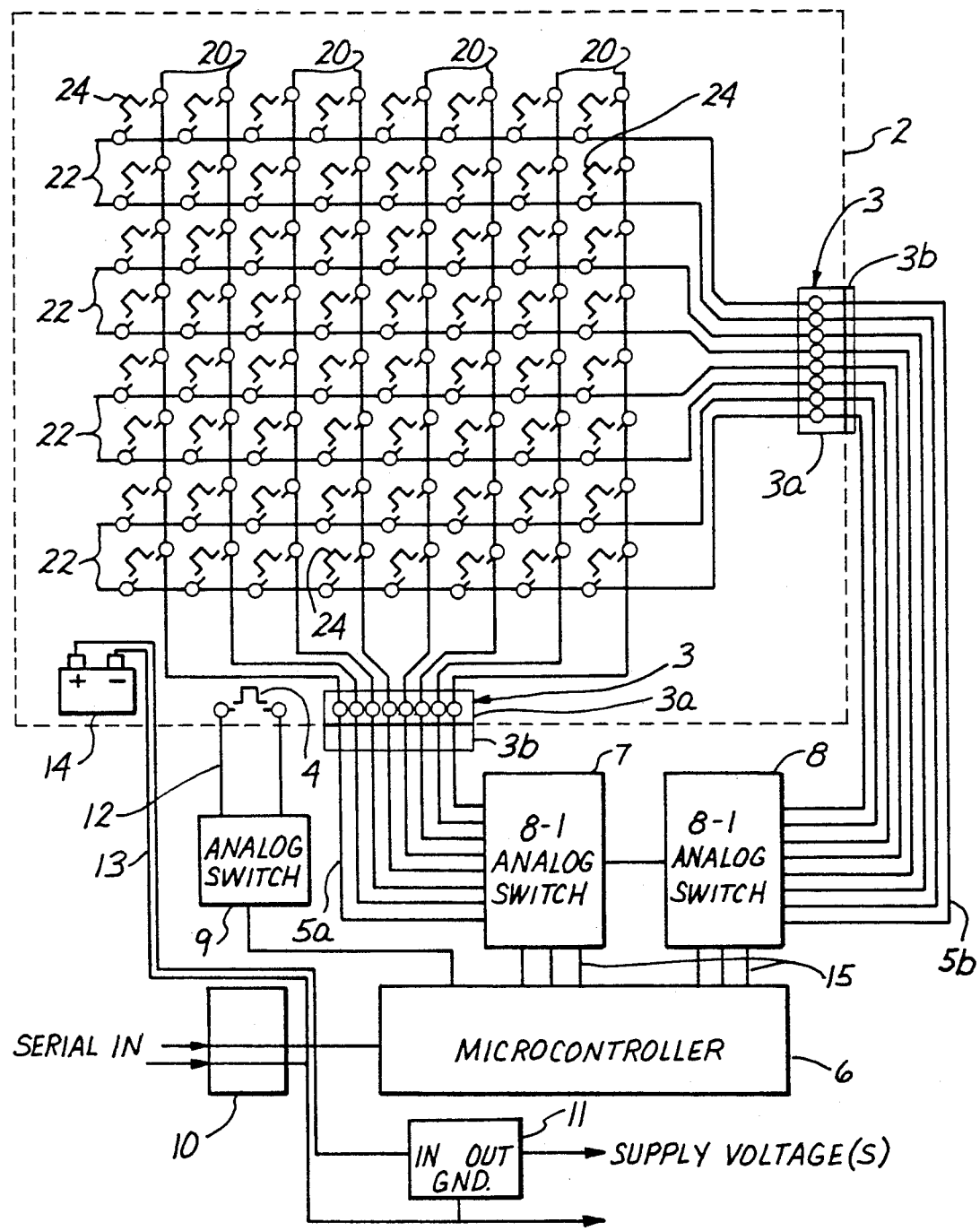
FIG. 1 is a block diagram of the preferred embodiment of the modifying electronics package according to this invention shown connected to a typical conventional 8 by 8 keypad matrix and related components found in most hand held remotes.

With reference to the drawing, FIG. 1 shows in schematic form components normally contained in the hand held housing, suggested by the dotted line box 2, of a typical infra-red remote control unit. A typical 8-by-8 keypad matrix circuit board is defined by two sets of conductors 20 and 22, arranged as rows and columns. These conductors are typically traces on a printed circuit board. In normal manual operation, push buttons 24 are depressed to make electrical contact between any selected column and row trace. This contact is decoded by the remote's original electronics, including a matrix decoder circuit, as being associated with one of several stored command sequences, and causes transmission of the selected command sequence to the controlled device. One or more latching mode switches 4 may also be mounted on this circuit board. A parallel ribbon cable (not shown) normally connects the conductors 20, 22 to the existing main circuit board of the remote control (not shown).

The modifying electronics package, installed in an existing remote control unit according to this invention, comprises all components shown outside dotted line box 2 in FIG. 1. A parallel ribbon cable 5, shown as two ribbon cables 5a and 5b for convenience in FIG. 1 but which normally is a single multiconductor ribbon cable, is connected to the conductors 20, 22 of the keypad circuit board through parallel connector 3, which includes mating male and female connector elements 3a and 3b respectively, and runs from this point to the modifying electronics package which comprises microcontroller 6, analog switches 7, 8 and 9, and serial connector 10. The drawing shows the connector 3 as two separate components, although in practice a single connector may be used. In the preferred form of the invention, connector element 3b is inserted between existing keypad board connector element 3a on the keypad board and another existing mating connector attached to the existing ribbon cable. The latter connector mates to connector element 3a in parallel with connector element 3b. In such an arrangement, two ribbon cables, one associated with the existing electronics of the remote and another connected to the interface electronics of this invention, are connected in parallel to the keypad board connector 3a. In effect then, the semiconductor switches 7 and 8 are connected in parallel with the existing matrix decoder circuit of the remote. This allows normal manual operation of the remote unit while it is interfaced for computer control. A similar connection is made for any existing latching switches 4, so that semiconductor latch switch 9 is connected in parallel with the existing circuits connected to switch 4.

Microcontroller 6 contains internal ROM for program storage, RAM, UART (for handling the serial communications), and sufficient Input/Output control lines to operate the electronics of the package. Power to the modifying electronics package is supplied by the existing battery 14, internal to the hand held housing of the remote control unit, which is connected via cable 13 to the package power supply 11. Power supply 11 converts the battery voltage into all supply voltages required by the modifying electronics package. In addition, cable 12 connects one or more discrete analog switches 9 to any existing manual latching mode switches 4.

Microcontroller 6 converts command selecting serial output from the serial port of the host microcomputer to a control input signal for driving the control inputs of the semiconductor switches 7, 8 and 9. During initialization, software resident in microcontroller 6 configures the internal UART to operate at the desired baud rate, etc. The microcontroller also disables all analog switches 7, 8 and 9 thus rendering them normally open circuit so that they have no effect on normal manual operation of the remote. Having completed initialization, the microcontroller places itself in STOP mode. Most simple microcontroller have a power saving mode, referred to here as STOP mode, whereby all microcontroller operations cease until a reset interrupt is received. This mode reduces power requirements for the microcontroller to virtually zero and is used in this application to prevent excessive battery drain by the package electronics.

As soon as the first logic level transition associated with a serial transmission from the host computer occurs, a reset pulse is sent to the microcontroller. Once awakened, the microcontroller remains operational until a complete command sequence has been received from the host via the serial link. If no command is received within a predefined time, the microcontroller will again shut down and wait for another transmission. Having received and decoded the host command sequence from the serial port, the microcontroller, via control inputs 15, causes one of the eight signal inputs 5a of analog switch 7 to be connected to the single output of switch 7 according to the column number selected in the host command. At the same time, one of the eight signal outputs 5b of analog switch 8 is connected to the single input of switch 8 according to the row number selected in the host command. In addition the open/closed state of mode control analog switch 9 is set up by the microcontroller. Having set up all switch addresses, the microcontroller 6 causes all analog switches to be enabled for a period of time specified in the host command, or a default time if not so specified. Control over analog switch enabling is accomplished via one of the microcontroller I/O pins. The command select sequence received in serial format from the host computer need not, and in fact typically is not, the same signal as the command sequence ultimately transmitted by the remote in response thereto.

Closure of the selected analog switches in the modifying electronics package will cause the existing microcontroller associated with keypad scanning and decoding of the unmodified remote to, in effect, detect closure of a manual switch 24 of the keypad corresponding to the row and column selected in the host's command select sequence. In response to this, a command sequence stored in the infra red remote and corresponding to the selected row and column will be transmitted by the existing infra-red transmitter circuits of the remote. If the detected switch closure persists for an extended period of time, agains as specified in the command select output of the host computer, then a string of repeated commands may be issued by the remote, as for example occurrs with volume or other level type controls.

Once the time duration of switch closure specified by the host system's command select sequence has elapsed, software microcontroller 6 causes the analog switches to be disabled, i.e. placed in an open state, thus removing the switch closure detected by the normal remote electronics. The microcontroller software then enters STOP mode until it is again awakened by another transmission from the serial port of the host microcomputer.

The components comprising the modifying electronics package can be readily mounted on a printed circuit board small enough to fit into available unused space in the original hand held housing of the remote controller unit. Installation of the package may consist of nothing more than disconnecting the existing ribbon cable from the keypad board connector element 3a, connecting connector 3b of the ribbon cable 5 thus connecting the modifying package to the keypad, connecting the mating connector of the existing ribbon cable of the remote electronics board to the new connector element 3b thereby connecting the keypad and the semiconductor switches in parallel to the original remote electronics, and tucking the modifying package into available space in the remote housing.

What is claimed is:

1. A modifying electronics package constituting an interface for use between a serial communications port of a host computer and an existing hand-held remote controller unit of the type having a keypad including a plurality of push-button switches manually actuatable for causing transmission by said remote controller unit of a command sequence stored in said remote controller unit corresponding to each of said push-button switches to a controlled device, said interface comprising:

normally open semiconductor switch means connected to said first and second pluralities of conductors in parallel with said keypad of the existing remote controller unit such that said keypad remains operative for manual actuation of said remote controller unit; and means responsive to output from said serial port for driving said semiconductor switch means thereby to simulate manual actuation of a selected switch in said matrix and thus cause transmission of the command sequence associated with said selected switch by the existing remote control circuitry, such that said remote controller unit can be actuated either manually through said keypad or under control of said host computer through said serial port.

2. The modifying electronics package of claim 1, wherein said keypad is connected in said remote controller unit by existing connectors said modifying package further comprising second connectors mateable to said existing connectors for connecting said semiconductor switch means electrically in parallel with said first and second pluralities of conductors.

3. The modifying electronics package of claim 2, said remote controller unit having an original housing sized for holding and pointing with one hand of a user, wherein said semiconductor switch means and said means responsive to serial output are all also enclosed in said housing.

4. The modifying electronics package of claim 3 wherein said semiconductor switch means and said means responsive to serial output are mounted on a common circuit board sized to fit into existing unused space in said original housing of the remote controller unit.

5. The modifying electronics package of claim 1 wherein said existing remote controller unit has a housing and a battery in said housing for powering said decoding and transmitting means, said modifying package being further characterized in that said semiconductor switch means and said means responsive to serial output are powered by said battery.

6. The modifying electronics package of claim 1 wherein said existing remote controller unit includes manually operable existing mode switch means for associating alternate sets of command sequence stored in the existing remote controller unit with particular ones of said push-button switches, said modifying package further comprising semiconductor mode switch means connected electrically in parallel with said existing mode switch means for simulating manual operation of said existing mode switch responsive to said serial output from the host computer serial port.

7. An interface for use between a serial communications port of a host computer and an existing hand-held push-button infra-red remote controller unit such that manual operation of the controller remains possible concurrently with operation controlled by the host computer, said remote controller unit being of the type having a housing sized for holding in one hand for pointing towards a controlled device, said housing containing a keypad comprised of first and second pluralities of conductors arranged to define a manually actuatable switch matrix, for causing transmission of corresponding command sequences stored in said remote controller unit, existing connectors interconnecting said keypad in said unit, infra-red transmitting means for transmitting command sequences selected by actuation of particular one of said switches to a controlled device, and battery means for powering the transmitting means, said modifying package comprising:

normally open semiconductor switch means having signal inputs, signal outputs and control inputs;

second connectors mateable to said existing connectors for connecting signal inputs and signal outputs of the switch means between said existing connectors; and means responsive to serial output from said serial port for driving said control inputs thereby to close said semiconductor switch means and cause transmission of a desired command sequence by the existing remote control circuitry under control of the host computer.

8. The interface of claim 7 wherein said existing connectors include mated first and second connector elements, and said second connectors are interposed between said first and second connector elements.

9. A method for interfacing a serial communications port of a host computer to an existing infra-red push-button remote controller unit such that manual operation of the controller remains possible concurrently with operation controlled by the host computer, said remote controller unit being of the type having a housing sized for holding in one hand for pointing towards a controlled device, said housing containing a keypad comprised of first and second pluralities of conductors arranged to define a push-button switch matrix manually actuatable for causing said remote control transmitter unit to transmit command sequences corresponding to particular switches in said matrix and stored in said controller unit, infra-red transmitting means for transmitting command sequences selected by actuation of said individual switches to a controlled device, and a battery for powering the decoding and transmitting means, said method comprising:

providing normally open semiconductor switch means having signal inputs, signal outputs and control inputs;

connecting said signal inputs and said signal outputs to said switch matrix such that said control inputs are operative for enabling connections between said signal inputs and said signal outputs for simulating actuation of individual switches in said matrix in response to output from said serial port;

thereby to cause transmission of a desired command sequence under control of the host computer.

10. The method of claim 9 further comprising the step of mounting said semiconductor switch means in existing unused space in said housing.

11. The method of claim 9 further comprising the step of connecting said battery for powering said switch means.

12. The method of claim 9 wherein said keypad includes a keypad board with a first connector element and a ribbon cable with a second connector element mateable to said first connector element, said method further comprising the step of connecting said second connector between said first and second connector elements such that manual operation of the controller remains possible through said keypad concurrently with operation controlled by the host computer.

* * * * *